United States Patent
Shirk, II (10) Patent No.: US 9,266,004 B2
(45) Date of Patent: Feb. 23, 2016

(54) BICYCLE WEIGHT TRAINER

(71) Applicant: Cort John Shirk, II, Dallas, TX (US)

(72) Inventor: Cort John Shirk, II, Dallas, TX (US)

(*) Notice: Subject to any disclaimer, the term of this patent is extended or adjusted under 35 U.S.C. 154(b) by 95 days.

(21) Appl. No.: 14/159,483

(22) Filed: Jan. 21, 2014

(65) Prior Publication Data

US 2015/0202515 A1 Jul. 23, 2015

(51) Int. Cl.
*A63B 69/16* (2006.01)
*A63B 21/00* (2006.01)

(52) U.S. Cl.
CPC ............ *A63B 69/16* (2013.01); *A63B 21/00003* (2013.01); *A63B 21/15* (2013.01)

(58) Field of Classification Search
CPC .................... A63B 21/00003; A63B 21/0004; A63B 21/00061; A63B 21/00065; A63B 21/06; A63B 21/08; A63B 21/1446; A63B 21/15; A63B 21/16; A63B 22/06; A63B 22/08; A63B 23/035; A63B 23/03508; A63B 23/04; A63B 23/0405; A63B 23/0476; A63B 23/0482; A63B 23/0494; A63B 69/16; A63B 2069/166; A63B 2208/0204; A63B 2208/0209; A63B 2208/0228; B62J 9/00; B62J 9/005; B62J 11/00; B62J 11/0005; B62J 11/02; B62K 3/00; B62K 3/02; B62K 19/00; B62K 19/30; B62K 19/40; B62K 19/42

See application file for complete search history.

(56) References Cited

U.S. PATENT DOCUMENTS

| | | | | |
|---|---|---|---|---|
| 444,642 A * | 1/1891 | Allen et al. | .................... | 224/426 |
| 522,186 A * | 7/1894 | Andrews | ....................... | 224/439 |
| 544,640 A * | 8/1895 | Leonard | ......................... | 224/426 |
| 567,162 A * | 9/1896 | Le Grand Peirce | ........... | 280/202 |
| 576,832 A * | 2/1897 | Bender et al. | ................. | 224/440 |
| 590,936 A * | 9/1897 | Perkins | .......................... | 224/439 |
| 595,959 A * | 12/1897 | Marshall | ....................... | 224/426 |
| 603,018 A * | 4/1898 | Beck | ............................. | 224/460 |
| 605,038 A * | 5/1898 | Wirt | .............................. | 224/440 |
| 618,612 A * | 1/1899 | Parsons | ........................ | 224/426 |
| 1,400,967 A * | 12/1921 | Merkel | ......................... | 180/219 |
| 3,837,546 A * | 9/1974 | Westermann | ................. | 224/429 |
| D258,731 S * | 3/1981 | Fleischman et al. | ......... | D12/409 |
| D271,758 S * | 12/1983 | Ervin | ........................... | D12/410 |
| 4,449,653 A * | 5/1984 | Pirolli | .......................... | 224/426 |
| 5,024,358 A * | 6/1991 | Reichert et al. | ............... | 224/414 |
| 5,031,807 A * | 7/1991 | Tiffany | ........................ | 224/429 |
| 5,071,046 A * | 12/1991 | Miller | .......................... | 224/585 |
| D331,557 S * | 12/1992 | Hurt | ............................ | D12/409 |
| 5,201,442 A * | 4/1993 | Bakalian | ...................... | 222/610 |
| 5,249,721 A * | 10/1993 | Brooks | ......................... | 224/426 |
| D366,446 S * | 1/1996 | Berman | ...................... | D12/409 |
| D366,447 S * | 1/1996 | Berman | ...................... | D12/409 |
| D367,034 S * | 2/1996 | Berman | ...................... | D12/409 |
| 5,752,898 A | 5/1998 | Porkka | | |
| 5,788,134 A * | 8/1998 | Matic, Jr. | ..................... | 224/414 |
| 6,253,979 B1 * | 7/2001 | Samson | ....................... | 224/426 |
| 6,401,997 B1 * | 6/2002 | Smerdon, Jr. | ................ | 224/414 |
| 2002/0153677 A1 * | 10/2002 | Laudon | ......................... | 280/7.14 |
| 2004/0036252 A1 * | 2/2004 | Englert | ...................... | 280/288.4 |
| 2004/0238549 A1 * | 12/2004 | Murray | ......................... | 220/705 |
| 2006/0186160 A1 * | 8/2006 | Hubbe | .......................... | 224/427 |

(Continued)

*Primary Examiner* — Oren Ginsberg
*Assistant Examiner* — Gary D Urbiel Goldner
(74) *Attorney, Agent, or Firm* — Yee & Associates, P.C.

(57) ABSTRACT

An apparatus comprising a weight system. The weight system is configured to be attached to a frame of a bicycle to increase the weight of the bicycle. The weight system is configured to be located in an area within a perimeter defined by a portion of the frame of the bicycle when attached to the frame.

13 Claims, 6 Drawing Sheets

(56) References Cited

U.S. PATENT DOCUMENTS

| | | | |
|---|---|---|---|
| 2007/0278273 A1* | 12/2007 | Hollis | 224/414 |
| 2010/0012696 A1* | 1/2010 | Prager | 224/417 |
| 2010/0084422 A1* | 4/2010 | Robota | 221/209 |
| 2010/0163589 A1* | 7/2010 | Kwak et al. | 224/435 |
| 2012/0186656 A1* | 7/2012 | Fitzgerald | 137/1 |
| 2012/0193382 A1* | 8/2012 | Wilson | 224/414 |
| 2012/0202649 A1* | 8/2012 | Huber | 482/2 |
| 2012/0305425 A1* | 12/2012 | Waters | 206/335 |
| 2014/0006115 A1* | 1/2014 | Scolari | 705/14.1 |
| 2014/0182094 A1* | 7/2014 | Zuraski et al. | 24/456 |
| 2014/0291368 A1* | 10/2014 | Scolari | 224/418 |
| 2014/0329134 A1* | 11/2014 | Lang | 429/156 |
| 2015/0114734 A1* | 4/2015 | Ogawa | 180/68.5 |

\* cited by examiner

BICYCLE WEIGHT TRAINER

BACKGROUND INFORMATION

1. Field

The present disclosure relates generally to weight training devices and, in particular, to a training device for a bicycle. Still more particularly, the present disclosure relates to a method and apparatus for changing the weight of the bicycle through a weight system managing weight of a bicycle.

2. Background

Today, bicycles are used for many reasons. For example, bicycles are used as tools for competitive sports, exercise, and pleasure. As exercise tools, bicycles are used for cardiovascular conditioning, strength training, and weight loss of users.

Users train with bicycles by exerting force on pedals of the bicycles. For example, a user may apply an amount of force on the pedals for a period of time to move the bicycle a particular distance at a particular velocity. The amount of force required for pedaling the bicycle at the particular speed and velocity is determined by resistance. The resistance is based, in part, on how much the bicycle weighs.

Users use weights to enhance training. Some weights are specifically designed for particular types of training. For example, weights have been used to enhance aerobic training. Weights for aerobic training are typically hand held or attached to the body of the user.

Weights have also been used to enhance training on bicycles. For example, weights have been designed to fit in a water bottle bracket. As another example, weights have been designed for an area underneath a bicycle frame. In this example, the weights are attached to the bicycle frame in the area underneath the bicycle frame.

A user of a bicycle typically modifies the bicycle according to user preferences. For example, seat positioning, handle bar positioning, and braking is normally modified based on preferences of the user. Some changes may also be made to the bicycle for particular uses.

For example, users often add additional accessories to a bicycle. Added accessories typically include water bottles, lights and reflectors, baskets to carry items, signaling devices, repair toolkits, kickstands, and speed, distance, and time monitoring devices.

Users, however, are limited in the number of ways a bicycle can be modified for use as an exercise tool. Depending on the type of exercise planned for a bicycle, the amount of space taken up by some accessories may not leave enough space for other items that a person may wish to add to the bicycle. As a result, some items may not be able to be mounted to the proper location of the bicycle for use.

Therefore, it would be advantageous to have an apparatus and system that takes into account at least some of the issues discussed above, as well as other possible issues.

SUMMARY

In one illustrative embodiment, an apparatus comprises a weight system. The weight system is configured to be attached to a frame of a bicycle to increase the weight of the bicycle. The weight system is configured to be located in an area within a perimeter defined by a portion of the frame of the bicycle when attached to the frame.

In another illustrative embodiment, a system for managing the weight of a bicycle comprises weight unit configured to be attached to a frame of the bicycle to increase the weight of the bicycle. The weight unit is configured to be located in an area within a perimeter defined by a portion the frame of the bicycle when attached to the frame. The portion is formed by elongate members of the frame of the bicycle. The weight unit is attached to the frame of the bicycle using a number of locations of the weight unit configured for attaching the weight unit to the elongate members of the frame of the bicycle. The system also comprises a number of connectors configured to secure the number of locations of the weight unit to the elongate members of the frame of the bicycle. The system increases the weight of the bicycle by attaching the weight unit to the elongate members of the frame of the bicycle using the number of connectors to secure the number of locations of the weight unit to the elongate members of the frame of the bicycle.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

The different illustrative embodiments recognize and take into account a number of different considerations. For example, the illustrative embodiments recognize and take into account that existing products for adding weight to a bicycle may be insufficient. One product, for example, involves inserting a weight into a water bottle bracket. Water bottle brackets, however, are not designed to hold weight of a weight training system. Water bottle brackets are designed to hold the weight of a water bottle. The weight of a water bottle may be less than the weight desired for a weight training system.

Another product involves attaching weight to an area underneath a bicycle frame. However, a limited amount of space is available in the area underneath the bicycle frame. Because the amount of space in the area underneath the frame is limited, the amount of weight that can be attached to the frame in the area underneath bicycle is also limited.

The illustrative embodiments also recognize and take into account components of a bicycle that are attached to a frame of the bicycle. For example, a water bottle, a light, shifters, brakes, reflectors, pouches, peddles, and other accessories and parts of the bicycle may be attached to the frame of the bicycle. These components may interfere with adding a weight training system to the frame. The different illustrative embodiments recognize and take into account that adding weight to a bicycle for using the bicycle as a weight training system may be more cumbersome than desired.

Thus, the different illustrative embodiments recognize and take into account that configuring a weight unit for use as a bicycle weight training system may be useful in reducing impact of the training system on other components of the bicycle. The different illustrative embodiments recognize and take into account that a weight training system may be configured for different weights by using a group of weight units of a known weight. With this configuration, different amounts of weight can be added to a bicycle for training purposes.

Figure 1:
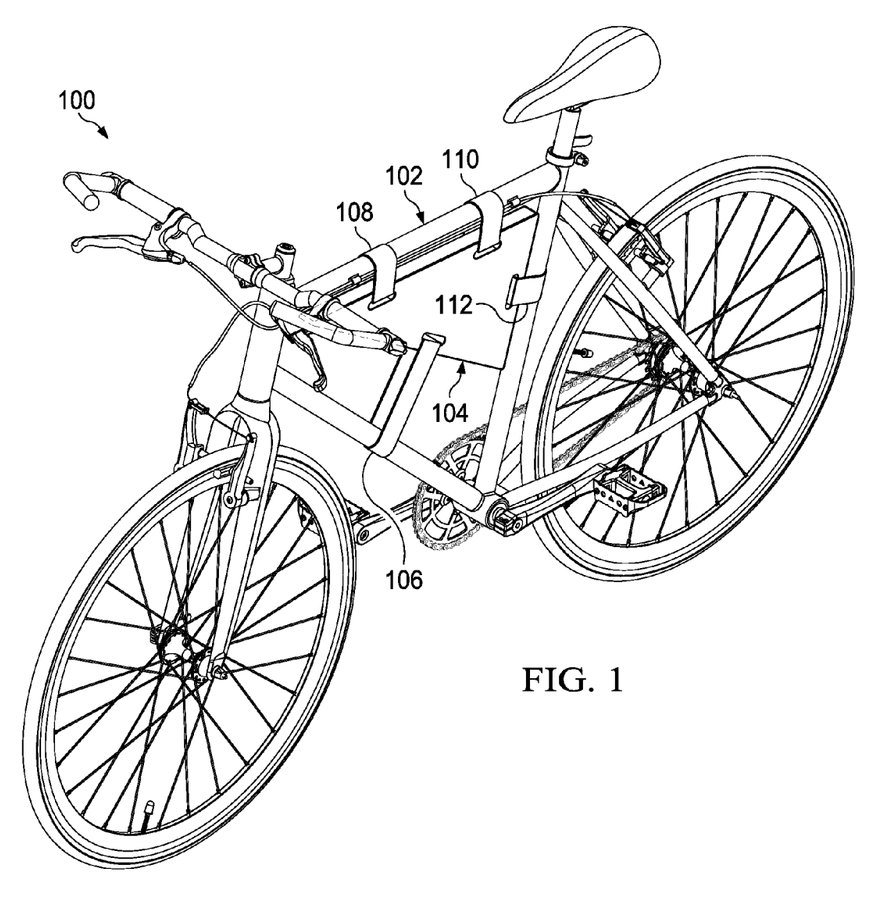
FIG. 1 is an illustration of an isometric view of a bicycle weight training system in accordance with an illustrative embodiment.

With reference now to the figures, and in particular with reference to FIG. 1, an illustration of an isometric view of a bicycle weight training system is depicted in accordance with an illustrative embodiment.

In this depicted example, bicycle weight training system 100 comprises weight unit 104 attached to frame 102 of a bicycle. As depicted, weight unit 104 is a thing having mass. As an example, weight unit 104 may include at least one of two and a half pounds, five (5) pounds, ten (10) pounds, twenty five (25) pounds, fifty (50) pounds, one hundred (100) pounds, or any other suitable amount of weight for use in bicycle weight training system 100. In the illustrative example, an amount that weight unit 104 weighs can be changed. The amount that weight unit 104 weights may be changed, in the depicted example, to an amount of weight desired for bicycle weight training system 100.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or a category. In other words, at least one of means any combination of items and number of items may be used from the list but not all of the items in the list are required. As used herein, "number of" when used with reference to items means one or more items.

In this illustrative example, weight unit 104 is configured to be attached within frame 102. Attaching weight unit 104 to frame 102 adds an amount of weight of weight unit 104 to frame 102. Detaching weight unit 104 from frame 102 removes the amount of weight of weight unit 104 from frame 102.

As depicted, connector 106, connector 108, connector 110, and connector 112 attach weight unit 104 to frame 102. In the illustrated example, when weight unit 104 is attached to frame 102, weight unit 104 is located within frame 102 of the bicycle. As depicted, weight unit 104 is fastened within frame 102 in a location that does not impede with use of at least one of water bottles, lights, shifters, brakes, reflectors, pouches, peddles, or other accessories and parts of the bicycle. A more detailed view of weight unit 104 within frame 102 is shown and described later.

Figure 2:
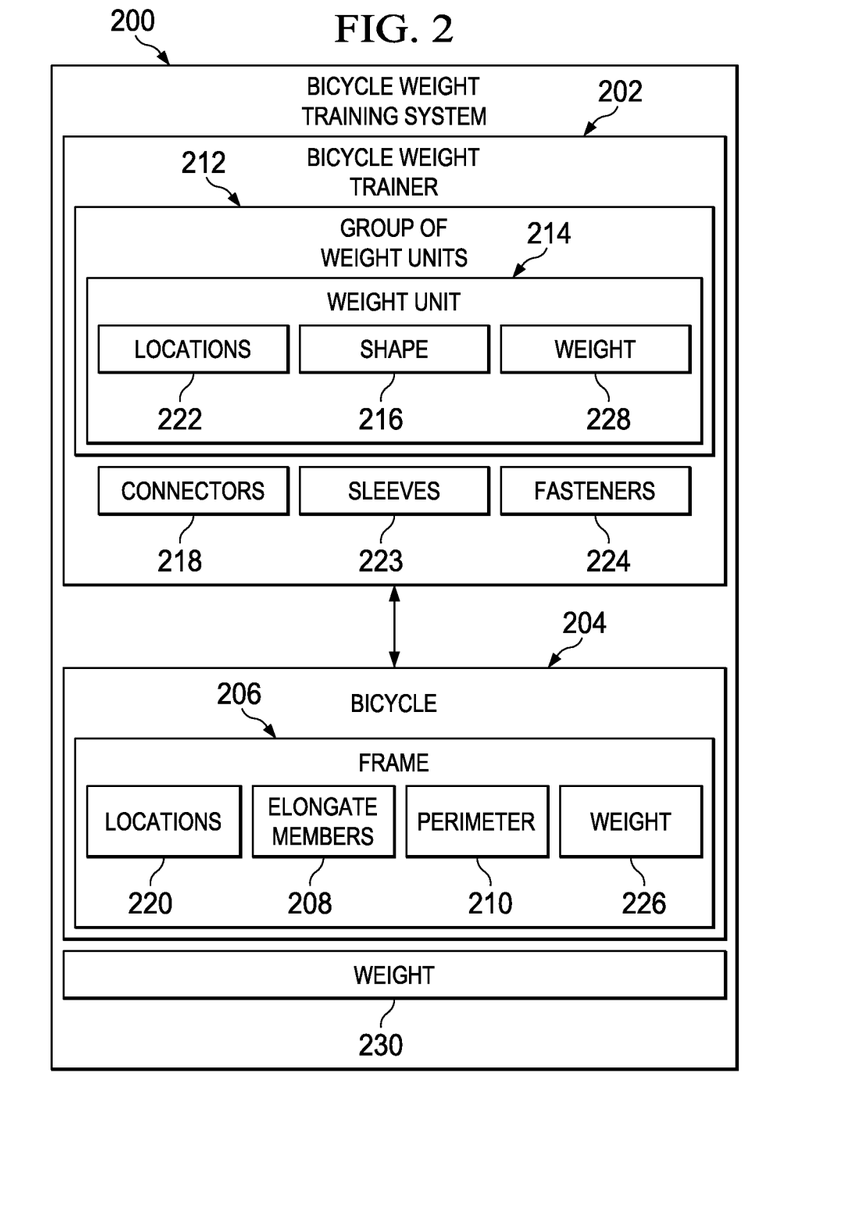
FIG. 2 is an illustration of a block diagram of components of a bicycle weight training system in accordance with an illustrative embodiment.

Referring now to FIG. 2, a block diagram of components of a bicycle weight training system is depicted in accordance with an illustrative embodiment. Bicycle weight training system 100 in FIG. 1 is an example of one implementation for bicycle weight training system 200 shown in block form in FIG. 2.

As depicted, bicycle weight training system 200 comprises bicycle weight trainer 202 and bicycle 204. Bicycle weight trainer 202 is configured to attach within frame 206 of bicycle 204. Frame 206 comprises elongate members 208. In these illustrative examples, elongate members 208 is at least one of top tubes, down tubes, seat tubes, seat stays, chain stays, or any other suitable parts of a frame of bicycle weight training system 200. Elongate members 208 form perimeter 210 of frame 206. In these illustrated examples, bicycle weight trainer 202 is attached within perimeter 210 of frame 206. Frame 102 in FIG. 1 is an example of one implementation for frame 206 shown in block form in FIG. 2.

As depicted, bicycle weight trainer 202 comprises group of weight units 212, such as weight unit 214. Weight unit 104 in FIG. 1 is an example of one implementation for weight unit 214 shown in block form in FIG. 2. Shape 216 of weight unit 214 is a configuration for weight unit 214 that fits within perimeter 210 of frame 206. For example, shape 216 of weight unit 214 may be selected for fitting weight unit 214 within perimeter 210 of frame 206. As used herein, "group of" when used with reference to items means one or more items.

Connectors 218 of bicycle weight trainer 202 are used to attach group of weight units 212 of bicycle weight trainer 202 to frame 206. Connector 106, connector 108, connector 110, and connector 112 in FIG. 1 are examples of one implementation for connectors 218 shown in block form in FIG. 2. Each connector in connectors 218 may be at least one of a strap, a cable, a rope, or other suitable types of connectors in bicycle weight training system 200. For example, connectors 218 may be nylon straps. As another example, connectors 218 may be straps configured to reduce or prevent wear and tear on elongate members 208. In this example, connectors 218 may be made of at least one of cloth, rubber, or other suitable types of materials.

As depicted, frame 206 has locations 220 where connectors 218 are used to attach weight unit 214 to perimeter 210 of frame 206. Weight unit 214 has locations 222 where connectors 218 are used to attach weight unit 214 to frame 206. For example, connectors 218 may be used to attach bicycle weight trainer 202 within perimeter 210 of frame 206 using locations 220 associated with locations 222. Locations 220 are associated with locations 222 based on shape 216 of weight unit 214 and perimeter 210 of frame 206. In these illustrative examples, using connectors 218 between associated locations 218 and locations 220, restrains weight unit within perimeter 210.

Sleeves 223 of bicycle weight trainer 202 are used to prevent wear and tear on locations 220 of frame 206. Each sleeve in sleeves 223 may be made of at least one of cloth, rubber, or other suitable types of materials. For example, the connectors 218 may be straps made of nylon. In these illustrative examples, sleeves 223 are configured to attach to the nylon straps by at least one of slipping over the nylon straps, using a clip, using a button, using a zipper, and by any other suitable way to attach a sleeve to a strap. As another example, a sleeve in sleeves 223 may be configured to wrap around a location in locations 220. In this example, the sleeve may include one or more slots or other types of connectors for use in attaching straps to the location of frame 206 that the sleeve is wrapped around.

In the illustrated examples, fasteners 224 of bicycle weight trainer 202 are used to fasten weight unit 214 to other weight units in group of weight units 212. Each fastener in fasteners 224 may comprise a bolt and nut, or other structure. In these illustrative examples, when fasteners 224 are loosened, a weight unit may be added to and removed from other weight units in group of weight units 212.

As depicted, weight 226 of frame 206 is how much frame 206 weighs before bicycle weight trainer 202 has been attached. Weight 228 of weight unit 214 is how much weight unit 214 weighs. In these illustrative examples, weight unit 214 may be comprised at least one of concrete, metal, or other suitable materials for use in bicycle weight training system 200.

Weight unit 214 may include an all weather coating. The all weather coating may increase longevity of weight unit 214. For example, an all weather coating for weight unit 214 may include at least one of epoxy, rubber, plastic, paint, a material applied to weight unit 214 through anodizing, or any other suitable coating to increase longevity of weight unit 214.

In the illustrated examples, weight unit 214 may further be a container. For example, weight unit 214 may be a container for holding at least one of sand, water, concrete, or other suitable materials for adding weight.

Weight 230 of bicycle weight training system 200 is how much bicycle 204 weighs when bicycle weight trainer 202 is attached to frame 206. In these illustrative examples, adding an additional weight unit to group of weight units 212 in bicycle weight trainer 202 increases weight 230 of bicycle weight training system 200. Removing a weight unit from group of weight units 212 in bicycle weight trainer 202 reduces weight 230 of bicycle weight training system 200.

The illustration of bicycle weight training system 200 shown in block form in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, a tandem bicycle may comprise additional elongate members in elongate members 208 forming an additional perimeter of frame 206. In this example an additional bicycle weight trainer other than bicycle weight trainer 202 may be attached within the additional perimeter of the tandem bicycle.

As another example, instead of using five (5) connectors to attach weight unit 214 to frame 206 a different number of connectors may also be used. For example, weight unit 214 may also be configured to use three (3) connectors, four (4), six (6) and any other suitable number of connectors for restraining weight unit 214 within perimeter 210 of frame 206.

Figure 3:
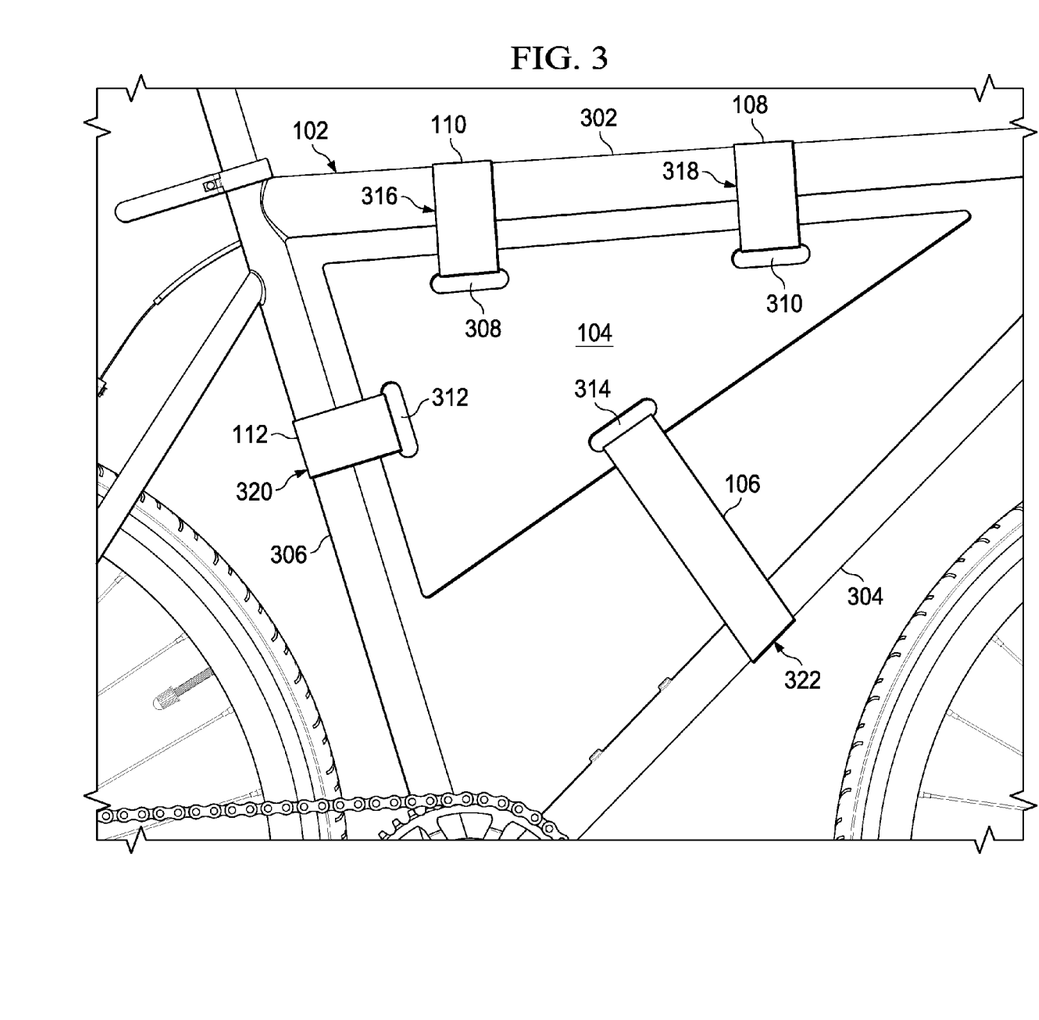
FIG. 3 is an illustration of a magnified view of a bicycle weight training system in accordance with an illustrative embodiment.

Turning next to FIG. 3, an illustration of a magnified view of a bicycle weight training system is depicted in accordance with an illustrative embodiment. Frame 102 and weight unit 104 in FIG. 3 are illustrative examples of frame 102 and weight unit 104 of FIG. 1. FIG. 3 is a more detailed view of weight unit 104 within frame 102 in FIG. 1. Connector 106, connector 108, connector 110, and connector 112 are illustrative examples of connector 106, connector 108, connector 110, and connector 112 of FIG. 1.

Top tube 302, down tube 304, and seat tube 306 of frame 102 are examples of elongate members 208 of frame 206 shown in block diagram form in FIG. 2. Slot 308, slot 310, slot 312, and slot 314 in weight unit 104 are examples of locations 222 in weight unit 214 shown in block diagram form in FIG. 2. Location 316, location 318, location 320, and location 322 of frame 102 are examples of locations 220 of frame 206 shown in block diagram form in FIG. 2.

In this illustrated example, weight unit 104 is restrained within top tube 302, down tube 304, and seat tube 306 of frame 102 by connector 106, connector 108, connector 110, and connector 112. Connector 108 restrains weight unit 104 by attaching at location 318 of top tube 302 and slot 310 of weight unit 104. Connector 110 restrains weight unit 104 by attaching at location 316 of top tube 302 and slot 308 of weight unit 104. Connector 106 restrains weight unit 104 by attaching at location 322 of down tube 304 and slot 314 of weight unit 104. And connector 112 restrains weight unit 104 by attaching at location 320 of seat tube 306 and slot 312 of weight unit 104.

Figure 4:
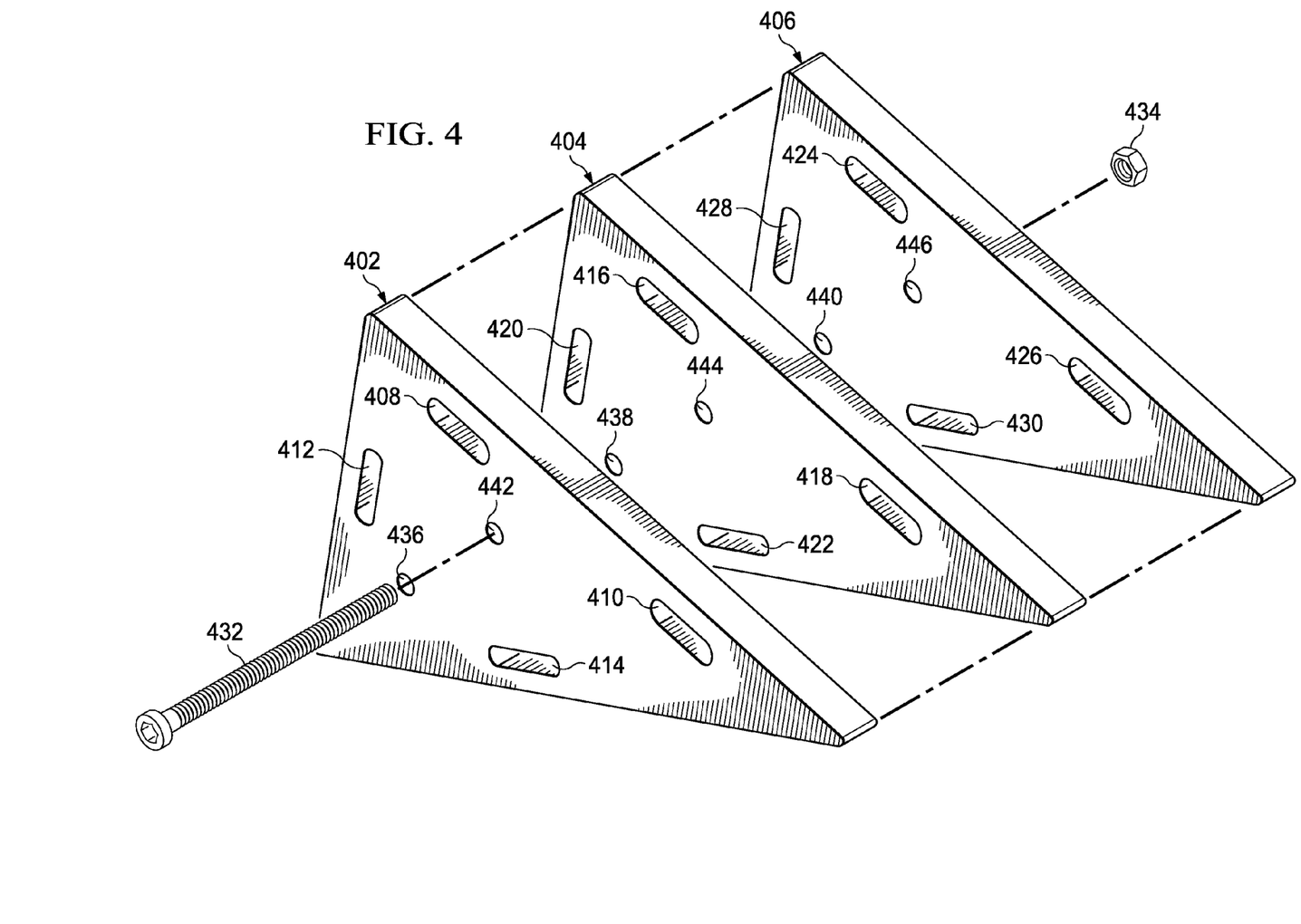
FIG. 4 is an illustration of an exploded view of a bicycle weight training system with fasteners for holding together a group of weight units of the weight training system in accordance with an illustrative embodiment.

Turning next to FIG. 4, an illustration of an exploded view of a bicycle weight training system with fasteners for holding together a number of weights of the weight training system is depicted in accordance with an illustrative embodiment. Weight unit 402, weight unit 404, and weight unit 406 in FIG. 4 is an example of group of weight units 212 shown in block diagram form in FIG. 2.

Slot 408, slot 410, slot 412, and slot 414 are an example of locations 222 of weight unit 214 shown in block diagram form in FIG. 2. Slot 416, slot 418, slot 420, and slot 422 are another example of locations 222 of weight unit 214 shown in block diagram form in FIG. 2. Slot 424, slot 426, slot 428, and slot 430 is a further example of locations 222 of weight unit 214 shown in block diagram form in FIG. 2.

In this illustrated example, bolt 432 and nut 434 is an example of fasteners 224 of bicycle weight trainer 202 shown in block diagram form in FIG. 2. As depicted, bolt 432 and nut 434 are used in a process for fastening weight unit 402, weight unit 404, and weight unit 406 together. For example, bolt 432 may be inserted through hole 436 in weight unit 402, hole 438 in weight unit 404, and hole 440 in weight unit 406. In this example, nut 434 is then attached to bolt 432 to fasten weight unit 402, weight unit 404, and weight unit 406 together. As another example, another bolt may also be inserted through hole 442 in weight unit 402, hole 444 in weight unit 404, and hole 446 in weight unit 406. In this example, another nut is then attached to the other bolt to fasten weight unit 402, weight unit 404, and weight unit 406 together.

Figure 5:
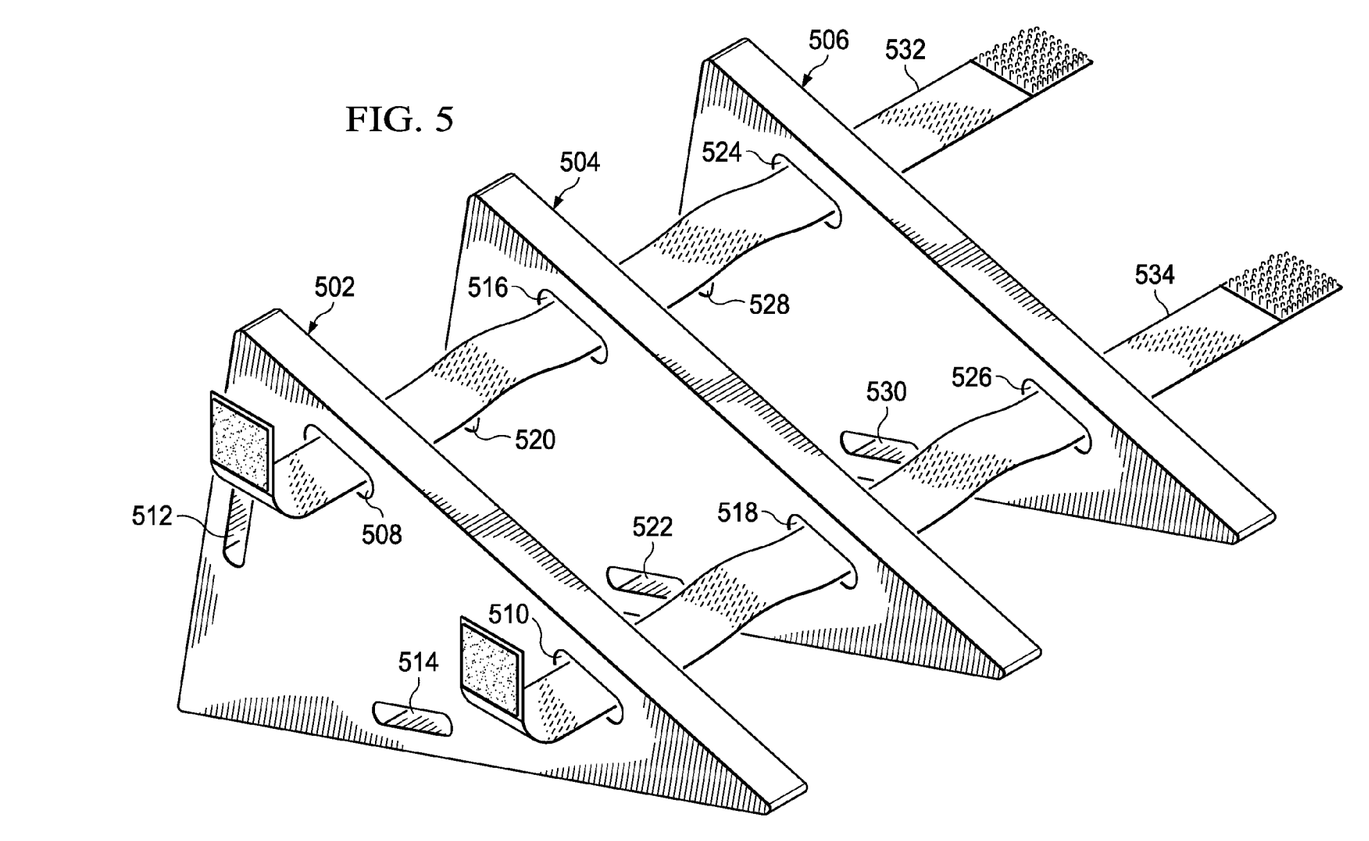
FIG. 5 is an illustration of an exploded view of a bicycle weight training system without fasteners in accordance with an illustrative embodiment.

Turning next to FIG. 5, an illustration of an exploded view of a bicycle weight training system without fasteners is depicted in accordance with an illustrative embodiment. Weight unit 502, weight unit 504, and weight unit 506 in FIG. 5 is an example of group of weight units 212 shown in block diagram form in FIG. 2.

Slot 508, slot 510, slot 512, and slot 514 is an example of locations 222 of weight unit 214 shown in block diagram form in FIG. 2. Slot 516, slot 518, slot 520, and slot 522 are another example of locations 222 of weight unit 214 shown in block diagram form in FIG. 2. Slot 524, slot 526, slot 528, and slot 530 are a further example of locations 222 of weight unit 214 shown in block diagram form in FIG. 2.

In this illustrated example, connector 532 and connector 534 is an example of connectors 218 of bicycle weight trainer 202 shown in block diagram form in FIG. 2. As depicted, connector 532 and connector 534 may be used in a process for fastening weight unit 502, weight unit 504, and weight unit 506 together. In this illustrated example, connector 532 is inserted through slot 508 of weight unit 502, slot 516 of weight unit 504, and slot 524 of weight unit 506 and connector 534 is inserted through slot 510 of weight unit 502, slot 518 of weight unit 504, and slot 526 of weight unit 506. In this example, connector 534 and connector 534 are used to hold weight unit 502, weight unit 504, and weight unit 506 together. Connector 532 and connector 534 may also be used to attach weight unit 502, weight unit 504, and weight unit 506 to a frame of a bicycle.

As another example, other connectors in connectors 218 may also be used in the process for fastening weight unit 502, weight unit 504, and weight unit 506 together. For example, another connector may be inserted through slot 512 of weight unit 502, slot 520 of weight unit 504, and slot 528 of weight unit 506 and still another connector may be inserted through slot 514 of weight unit 502, slot 522 of weight unit 504, and slot 530 of weight unit 506. In this example, the other connectors are used to hold weight unit 502, weight unit 504, and weight unit 506 together. In these illustrated examples, connector 532, connector 534 and other connectors may be used to attach weight unit 502, weight unit 504, and weight unit 506 to a frame of a bicycle while also holding weight unit 502, weight unit 504, and weight unit 506 together.

Figure 6:
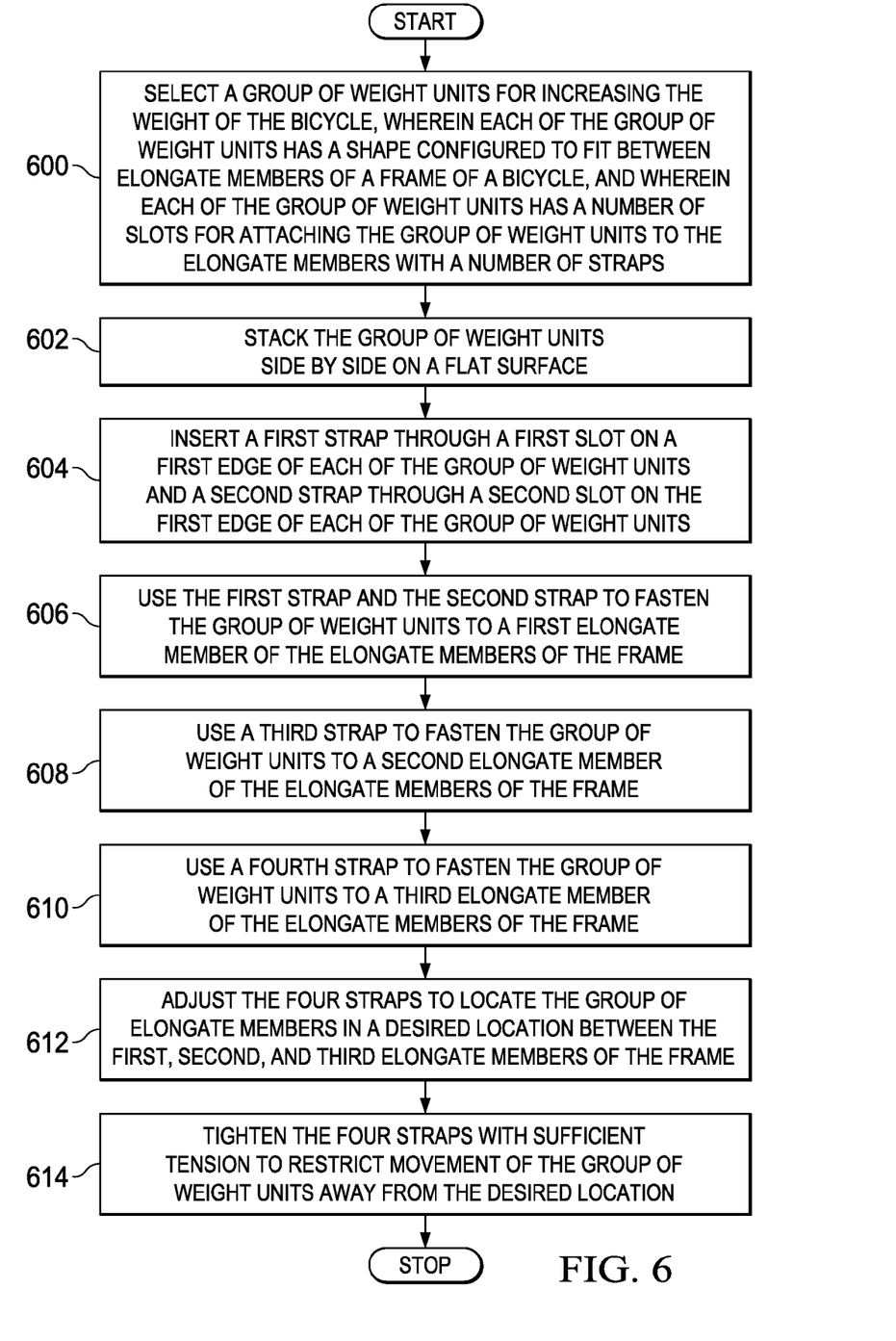
FIG. 6 is an illustration of a flowchart of a process for managing weight of a bicycle in accordance with an illustrative embodiment.

Turning now to FIG. 6, an illustration of a flowchart of a process for managing weight of a bicycle is depicted in accordance with an illustrative embodiment. In this illustrative example, the process depicted in FIG. 6 may be implemented using components of bicycle weight training system 200 shown in block form in FIG. 2.

The process begins by selecting a group of weight units for increasing the weight of the bicycle, wherein each of the group of weight units has a shape configured to fit between elongate members of a frame of a bicycle, and wherein each of the group of weight units has a number of slots for attaching the group of weight units to the elongate members with a number of straps (operation 600). The group of weight units is an example of group of weight units 212 of bicycle weight trainer 202 shown in block diagram form in FIG. 2. The elongate members of the frame of the bicycle are an example of elongate members 208 of frame 206 of bicycle 204 shown in block diagram form in FIG. 2. The number of straps is an example of connectors 218 of bicycle weight trainer 202 shown in block diagram form in FIG. 2. The shape configured to fit between the elongate members of the frame is an example of shape 216 in FIG. 2 configured to fit within perimeter 210 in FIG. 2 formed by elongate members 208.

The process stacks the group of weight units side by side on a flat surface (operation 602). The process next inserts a first strap through a first slot on a first edge of each of the group of weight units and a second strap through a second slot on the first edge of each of the group of weight units (operation 604).

The process uses the first strap and the second strap to fasten the group of weight units to a first elongate member of the elongate members of the frame (operation 606). The process uses a third strap to fasten the group of weight units to a second elongate member of the elongate members of the frame (operation 608). The process uses a fourth strap to fasten the group of weight units to a third elongate member of the elongate members of the frame (operation 610). The first elongate member is an example of top tube 302 in FIG. 3. The second elongate member is an example of down tube 304 in FIG. 3. The third elongate member is an example of seat tube 306 in FIG. 3.

The process adjusts the four straps to locate the group of weight units in a desired location between the first, second, and third elongate members of the elongate members of the frame (operation 612). The process then tightens the four straps with sufficient tension to restrict movement of the group of weight units away from the desired location (operation 614).

Of course, other operations (not shown in this figure) may also be performed prior to the process terminating. For example, the group of weight units may be held together using fasteners, such as fasteners 224 shown in block diagram form in FIG. 2.

Thus, the illustrative embodiments provide a system and apparatus for managing weight of a bicycle. A bicycle weight trainer is configured to be attached to a frame of a bicycle to increase the weight of the bicycle. The weight system is configured to be located in an area within a perimeter defined by a portion of the frame of the bicycle when attached to the frame. The portion of the frame defining the perimeter is formed by elongate members of the frame. The bicycle weight trainer is attached to the elongate members of the frame using a number of locations configured for attaching the bicycle weight trainer to the elongate members of the frame of the bicycle. The bicycle weight trainer also comprises a number of connectors configured to secure the number of locations of the weight system to the elongate members of the frame of the bicycle.

In the illustrative examples, the bicycle weight trainer is configured to easily increase weight of a bicycle. In this manner, training is improved by adding additional weight to the bicycle. The use of the bicycle weight trainer does not impede with a use of other components of the bicycle.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a weight system configured to be attached to a frame of a bicycle to increase the weight of the bicycle, wherein the weight system is configured to be located in an area within a perimeter defined by a portion of the frame of the bicycle when attached to the frame, wherein the weight system comprises:
    a plurality of weight units, wherein each weight unit in the plurality of weight units comprises a plurality of slots, and wherein the plurality of weight units are stacked together such that corresponding slots in the plurality of slots in the plurality of weight units are aligned to form a plurality of groups of aligned slots in the plurality of weight units; and
    a plurality of straps, wherein each strap in the plurality of straps is extended through a one of the group of aligned slots in the plurality of weight units to hold the plurality of weight units together, and wherein the plurality of straps form a number of connectors configured to secure the plurality of weight units to the frame of the bicycle.

2. The apparatus of claim 1, wherein the portion of the frame is formed by elongate members of the frame.

3. The apparatus of claim 2, wherein the weight system is configured to attach to the frame of the bicycle using a number of locations of the weight system configured for attaching the weight system to the elongate members of the frame of the bicycle.

4. The apparatus of claim 3, wherein:
the number of connectors are configured to secure the number of locations of the weight system to the elongate members of the frame of the bicycle.

5. The apparatus of claim 4, further comprising:
a number of sleeves configured to protect the elongate members of the frame from wear and tear from the plurality of straps, wherein the plurality of straps use the number of sleeves to protect locations of the elongate members where the weight system is attached, wherein each sleeve in the number of sleeves is attached to a strap in the plurality of straps by slipping over the strap.

6. The apparatus of claim 3, wherein the weight system has a shape corresponding to the portion of the frame formed by the elongate members of the frame where the weight system is configured to be attached.

7. The apparatus of claim 3, wherein the number of locations of the weight system for attaching the weight system to the elongate members of the frame includes at least three locations.

8. The apparatus of claim 7 wherein the elongate members of the frame includes at least two of a top tube, down tube, and a seat tube, and wherein the number of locations includes a first location to attach the weight system to the top tube of the frame, a second location to attach the weight system to the seat tube of the frame, and a third location to attach the weight system to the down tube of the frame.

9. The apparatus of claim 1, wherein the weight system, when attached to the frame in the area within the perimeter defined by the portion of the frame of the bicycle, does not impede with use of accessories and parts of the bicycle attached to the frame of the bicycle.

10. The apparatus of claim 1, wherein each weight unit in the plurality of weight units is a metal and wherein the weight unit includes an all weather coating.

11. The apparatus of claim 1, wherein each weight unit in the plurality of weight units is a container and the container is filled with material.

12. A method for managing weight of a bicycle, comprising:
stacking together a plurality of weight units configured to be attached to a frame of the bicycle to increase the weight of the bicycle, wherein the plurality of weight units are configured to be located in an area within a perimeter defined by a portion of the frame of the bicycle when attached to the frame, the portion is formed by elongate members of the frame of the bicycle, and wherein the plurality of weight units are attached to the frame of the bicycle using a number of locations of the plurality of weight units configured for attaching the plurality of weight units to the elongate members the frame of the bicycle, wherein each weight unit in the plurality of weight units comprises a plurality of slots, and wherein the plurality of weight units are stacked together such that corresponding slots in the plurality of slots in the plurality of weight units are aligned to form a plurality of groups of aligned slots in the plurality of weight units;
extending a strap through each of the group of aligned slots in the plurality of aligned slots to hold the plurality of weight units together and to provide a number of connectors configured to secure the number of locations of the plurality of weight units to the elongate members of the frame of the bicycle; and
increasing the weight of the bicycle by attaching the plurality of weight units to the elongate members of the frame of the bicycle using the number of connectors to secure the number of locations of the weight unit to the elongate members of the frame of the bicycle.

13. The method of claim 12, wherein each weight unit in the plurality of weight units has a shape corresponding to the portion of the frame formed by the elongate members where the weight unit is configured to be attached.

* * * * *